United States Patent
Kobayashi et al.

(10) Patent No.: US 6,445,526 B1
(45) Date of Patent: *Sep. 3, 2002

(54) REPRODUCING APPARATUS CAPABLE OF CONTROLLING AMPLITUDE AND PHASE CHARACTERISTICS OF REPRODUCED SIGNALS

(75) Inventors: Kiwamu Kobayashi, Kanagawa-ken; Tatsuya Naitoh, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,716

(22) Filed: Nov. 21, 1997

Related U.S. Application Data

(63) Continuation of application No. 08/534,168, filed on Sep. 26, 1995, now abandoned.

(30) Foreign Application Priority Data

Oct. 4, 1994 (JP) .............................................. 6-240039

(51) Int. Cl.[7] .............................. G11B 5/035; G11B 5/09

(52) U.S. Cl. .............................. 360/65; 360/46; 375/232
(58) Field of Search ...................... 360/46, 65; 375/229, 375/230, 232; 330/304

(56) References Cited

U.S. PATENT DOCUMENTS

| 4,314,288 | A | * | 2/1982 | Gyi .............................. 360/65 |
| 4,422,108 | A | * | 12/1983 | Sampei et al. ................. 360/65 |
| 5,450,253 | A | * | 9/1995 | Seki et al. ..................... 360/65 |
| 5,481,564 | A | * | 1/1996 | Kakuishi et al. ............. 375/230 |

* cited by examiner

*Primary Examiner*—Regina Y. Neal
(74) *Attorney, Agent, or Firm*—Fitzpatrick, Cella, Harper & Scinto

(57) ABSTRACT

In a reproducing apparatus, an equalizing system including a plurality of elements to be controlled is arranged to have its equalizing characteristic simply variable by controlling, with a single parameter, the plurality of elements to be controlled. Further, circuit characteristics of the equalizing system which are based on resonance frequencies and quality factors (Q) are controlled by controlling the resonance frequencies and the quality factors (Q) through the control performed with the single parameter over the plurality of elements to be controlled.

13 Claims, 15 Drawing Sheets

FIG.3

TRANSFER FUNCTION AND CONSTANT TO BE CONTROLLED OF EACH CIRCUIT

| | KIND | TRANSFER FUNCTION | CONSTANT TO BE CONTROLLED |
|---|---|---|---|
| (a) | INTEGRAL EQUALIZING CIRCUIT | $\dfrac{S + \omega_S}{S}$ | $\omega_S$ |
| (b) | SECOND-ORDER LOW-PASS FILTER | $\dfrac{\omega_1^2}{S^2 + \dfrac{\omega_1}{Q_1} S + \omega_1^2}$ | $\omega_1, Q_1$ |
| (c) | SECOND-ORDER LOW-PASS FILTER HAVING TRANSMISSION ZERO POINT | $\dfrac{S^2 + \omega_N^2}{S^2 + \dfrac{\omega_2}{Q_2} S + \omega_2^2}$ | $\omega_2, Q_2$ |
| (d) | SECOND-ORDER PHASE SHIFT FILTER | $\dfrac{S^2 - \dfrac{\omega_{2D}}{Q_{2D}} S + \omega_{2D}^2}{S^2 + \dfrac{\omega_{2D}}{Q_{2D}} S + \omega_{2D}^2}$ | $\omega_{2D}, Q_{2D}$ |
| (e) | FIRST-ORDER PHASE SHIFT FILTER | $\dfrac{S - \omega_{1D}}{S + \omega_{1D}}$ | $\omega_{1D}$ |

SETTING CTL FOR FLUCTUATIONS IN ELECTROMAGNETIC CONVERSION CHARACTERISTIC

DELAY CHARACTERISTICS OF 11, 12, 13

KIND OF MEDIUM AND DELAY CHARACTERISTIC gd : GROUP DELAY $$\begin{bmatrix} i_1 \\ i_2 \end{bmatrix} = \begin{bmatrix} 0 & \pm G \\ \mp G & 0 \end{bmatrix} \begin{bmatrix} V_1 \\ V_2 \end{bmatrix} \quad \text{Y PARAMETER OF GYRATOR}$$

$$Z_1 = \frac{V_1}{i_1} = j\omega c / G^2$$

$$L = \frac{R_7 R_9 C_{10} R_{11}}{R_8}$$

$L = C_{13} R_{12} R_{13}$
$R = R_{12} + R_{13}$

SECOND-ORDER PHASE SHIFT FILTER

CONTROL OVER $Q_{2D}$

SECOND-ORDER PHASE SHIFT FILTER

FIRST-ORDER PHASE SHIFT FILTER

FIRST-ORDER PHASE SHIFT FILTER

REPRODUCING APPARATUS CAPABLE OF CONTROLLING AMPLITUDE AND PHASE CHARACTERISTICS OF REPRODUCED SIGNALS

This application is a continuation of application Ser. No. 08/534,168, filed Sep. 26, 1995, now abandoned.

BACKGROUND OF THE INVENTION

1. Field of the Invention

This invention relates to a reproducing apparatus and more particularly to a reproduction equalizing process for a digital signal reproduced from a recording medium.

2. Description of the Related Art

In transmitting signals, it has generally been practiced to carry out an equalizing process, on the signal receiving side, to compensate in any loss for obtaining good signals by controlling the frequency characteristic of signals received from a transmission system.

Known transmitting apparatuses of the kind mentioned above include, for example, a digital VTR which records and reproduces a video signal (in the form of a digital signal) on and from a magnetic tape and is also arranged to perform an equalizing process on reproduced signals.

A magnetic recording/reproducing apparatus such as the digital VTR has a transmission characteristic such that the signal transmitted deteriorates in low and high frequency domains. The deterioration in the low frequency domain is attributable to a differential characteristic which is intrinsic to an induction coil type magnetic head and also a low-band cutoff characteristic of a rotary transformer. The deterioration in the high frequency domain is caused by a loss resulting from the wavelength dependency of the recording medium, a core loss of the magnetic head, and a spacing loss between the magnetic head and the recording medium.

In the case of the digital VTR or a digital data recorder, if the deterioration of such characteristics is excessive, there arises some waveform distortion such as intersymbol interference or the like, which greatly deteriorates the transmission characteristic.

In view of the above, digital VTRs have been arranged to use a waveform equalizing circuit to make the reproduced signal have an adequate waveform by compensating for signal deterioration resulting from the above-stated factors. FIG. 1 shows in a block diagram the arrangement of the conventional digital VTR.

Referring to FIG. 1, a signal reproduced from a tape T by a head 1 is supplied via a rotary transformer 2 to a preamplifier 3 to be amplified therein. The amplified reproduced signal is supplied to an integrating circuit 4. The integrating circuit 4 processes the signal to compensate mainly for deterioration of the low frequency domain of the signal. The signal thus compensated is supplied to an amplitude equalizer 5 to be compensated for deterioration of the high frequency domain. The signal is then supplied to a phase equalizer 6.

The phase equalizer 6 processes the signal from the amplitude equalizer 5 to compensate for a phase deviation of a whole circuit resulting from magnetic recording and reproducing characteristics and the characteristic of the circuit. A signal 7 is thus obtained as an output of the phase equalizer 6. The signal 7 is supplied to a circuit of a subsequent stage. The circuit of the subsequent stage then restores the signal 7 to its original state of digital data.

Generally, the frequency characteristic of each of the integrating circuit 4, the amplitude equalizer 5 and the phase equalizer 6 is arranged to be controllable. A desired frequency characteristic can be obtained by adjusting a plurality of control points within each of these circuits according to the state of the reproduced signal and the kind of the magnetic tape in use.

In the case of the VTR of the above-stated kind, however, it is hardly possible to adequately adjust the frequency characteristic of the integrating circuit and those of the equalizers since the plurality of adjusting points are affected by each other. In other words, in individually adjusting the plurality of adjusting parts for each of these circuits, after the frequency characteristic is controlled and adjusted to an optimum characteristic for one adjusting part, the characteristic of this part would be affected by the adjustment made for another adjusting part, thereby necessitating readjustment.

Therefore, according to the arrangement of the conventional digital VTR, the frequency characteristic either cannot be adjusted as desired or necessitates much time and labor for adjustment.

SUMMARY OF THE INVENTION

This invention is directed to the solution of the problem of the prior art mentioned above.

It is, therefore, an object of this invention to provide an apparatus which is arranged to be capable of obtaining an optimum equalizing characteristic through a simple control.

To attain this object, a reproducing apparatus arranged according to this invention is provided with reproducing means for reproducing a signal, equalizing means, having a plurality of controllable elements, for equalizing the signal reproduced by the reproducing means, and control means for controlling an equalizing characteristic of the equalizing means by controlling, with a single parameter, the plurality of controllable elements of the equalizing means.

It is another object of this invention to provide an apparatus arranged to control and optimize characteristics of circuits resulting from a resonance frequency and a quality factor (Q).

These and other objects and features of this invention will become apparent from the following detailed description of embodiments thereof taken in connection with the accompanying drawings.

BRIEF DESCRIPTION OF THE DRAWINGS

FIG. 3 shows transfer functions of circuits included in the embodiment of this invention.

DETAILED DESCRIPTION OF THE PREFERRED EMBODIMENTS

The following describes an embodiment of this invention in detail with reference to the drawings.

Figure 1:
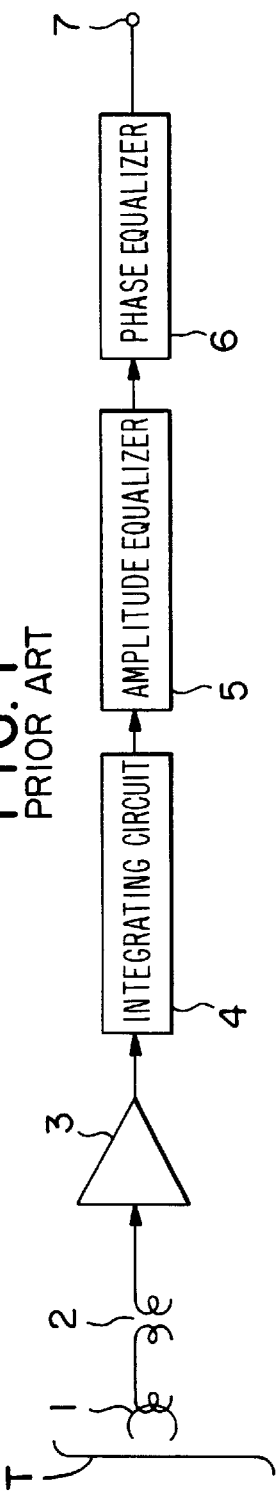
FIG. 1 is a block diagram of the arrangement of the conventional digital VTR.
Figure 2:
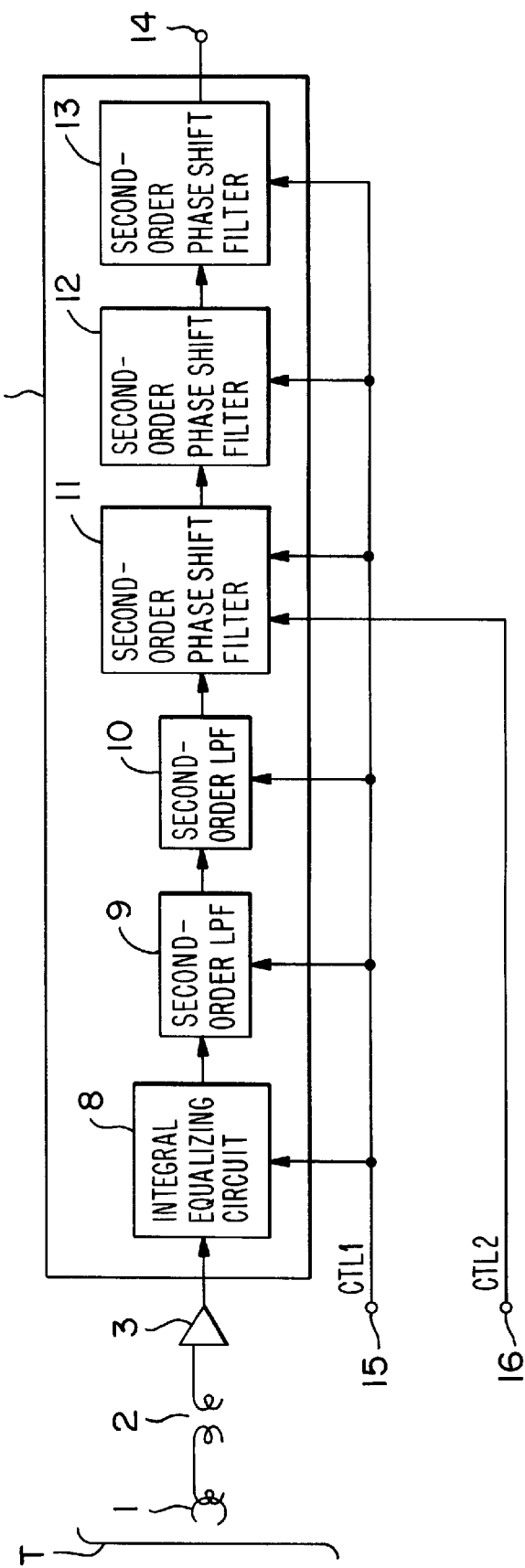
FIG. 2 is a block diagram of the arrangement of a digital VTR arranged as an embodiment of this invention.

In the case of this embodiment, the invention is applied to a digital VTR. FIG. 2 is a block diagram of the arrangement of a reproduction system of the digital VTR.

Referring to FIG. 2, a signal reproduced from a tape T by a head 1 is supplied via a rotary transformer 2 to a preamplifier 3. The preamplifier 3 amplifies the reproduced signal up to a predetermined level and then supplies the amplified signal to an integral equalizing circuit 8. The integral equalizing circuit 8 compensates for a differential characteristic of the reproduced signal and then supplies the compensated signal to a second-order low-pass filter (hereinafter referred to as LPF) 9. The second-order LPF 9 and another second-order LPF 10 which has a transmission zero point are arranged to compensate for a high frequency component of the reproduced signal and to attenuate, at the same time, an unnecessary low frequency component of the reproduced signal.

The integral equalizing circuit 8 and the LPFs 9 and 10 respectively have transfer characteristics which are shown in FIG. 3. A part (a) of FIG. 3 shows the transfer characteristic of the integral equalizing circuit 8 and parts (b) and (c) show the transfer characteristics of the LPFs 9 and 10, respectively. In FIG. 3, a symbol ω denotes a resonance frequency of the applicable circuit and Q denotes a quality factor.

Figure 4:
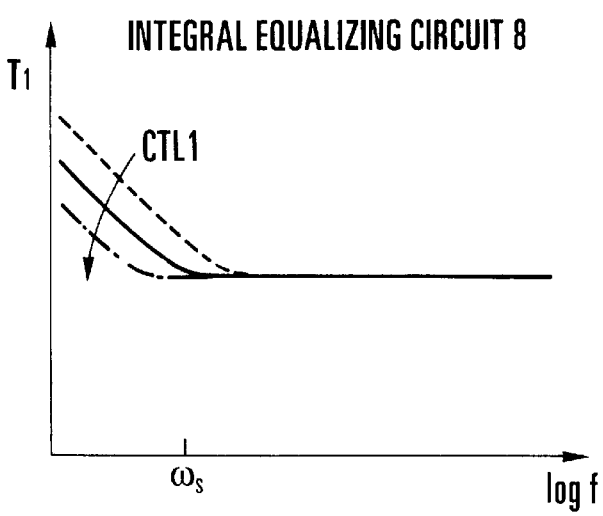
FIG. 4 shows the frequency control characteristic of an integral equalizing circuit shown in FIG. 2.
Figure 5:
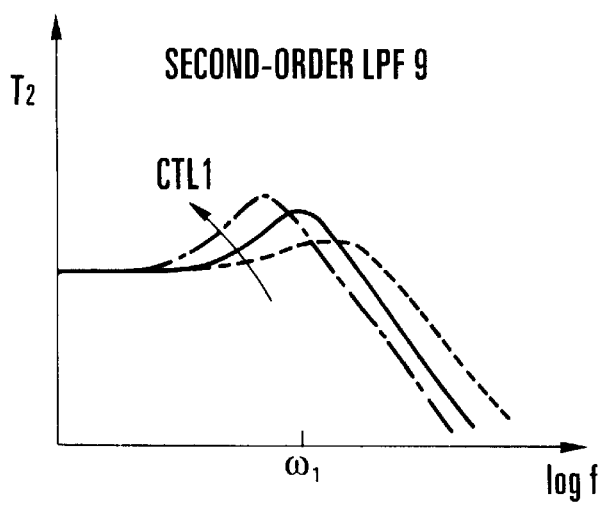
FIG. 5 shows the frequency control characteristic of an LPF shown in FIG. 2.
Figure 6:
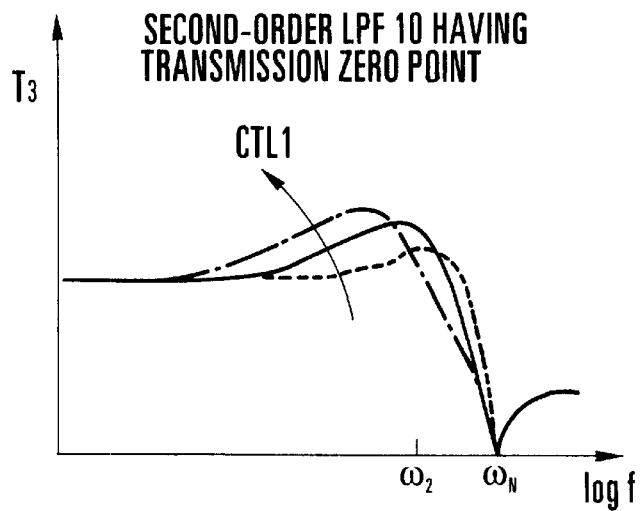
FIG. 6 shows the frequency control characteristic of another LPF which is also shown in FIG. 2 and arranged to have a transmission zero point.
Figure 7:
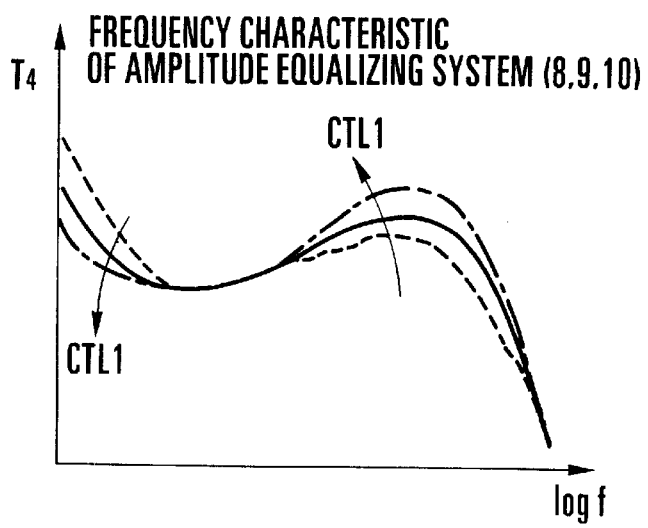
FIG. 7 shows the frequency control characteristic of an amplitude equalizing system shown in FIG. 2.

The frequency characteristics of these circuits 8, 9 and 10 are shown by full lines in FIGS. 4, 5 and 6, respectively. As apparent from FIGS. 4, 5 and 6, the integral equalizing circuit 8 compensates for a loss in the low frequency component of the reproduced signal, while the LPFs 9 and 10 compensate for deterioration of the high frequency component. FIG. 7 shows a frequency characteristic obtained with the integral equalizing circuit 8 and the LPFs 9 and 10 considered together.

The reproduced signal outputted from the LPF 10 is supplied to a second-order phase shift filter 11. In the case of this particular embodiment, other phase shift filters 12 and 13 are likewise arranged in two steps. The phase shift filters 11, 12 and 13 are thus arranged stepwise, in a total of three steps, to compensate for differences of a phase characteristic varying with the recording medium and also for the phase characteristics of the LPFs 9 and 10.

The transfer function of the phase shift filter of this kind (second-order) is shown at a part (d) in FIG. 3. The phase shift filter of this kind generally has a delay characteristic which is shown in FIG. 8.

Figure 8:
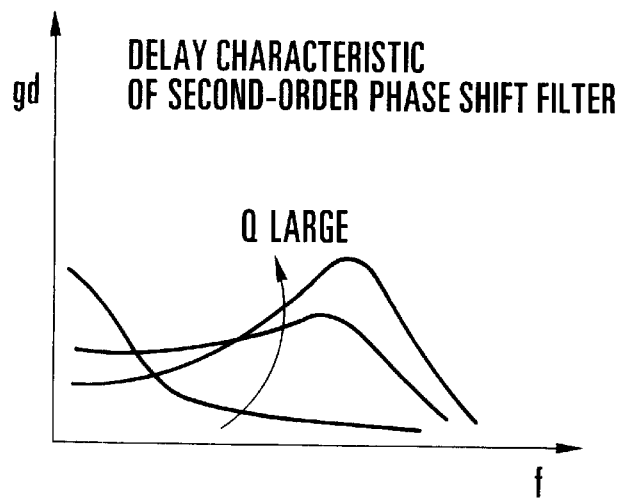
FIG. 8 shows the delay characteristic of a phase shift filter shown in FIG. 2.
Figure 9:
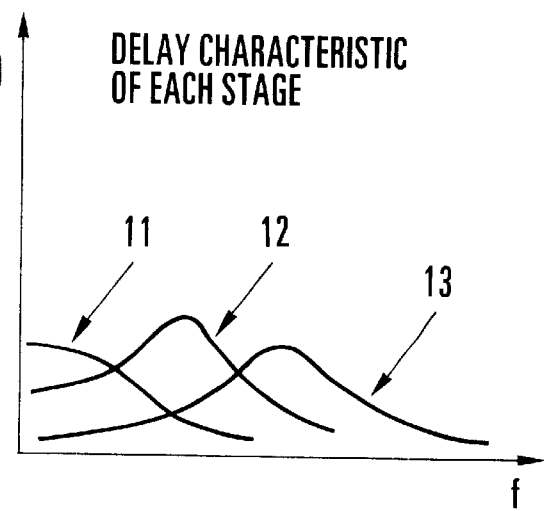
FIG. 9 shows the delay characteristic of each step of the phase shift filter shown in FIG. 2.

Referring to FIG. 8, the amount of delay of a band in the neighborhood of a resonance frequency co $\omega_{2D}$ increases accordingly as a value $Q_{2D}$ of the phase shift filter of this kind becomes larger. The amount of delay of a low frequency band, on the other hand, increases accordingly as the value $Q_{2D}$ becomes smaller. In the case of this embodiment, the phase shift filters 11, 12 and 13 are arranged to share with each other an action for compensating for a phase deviation of the signal of each frequency band in a manner as shown in FIG. 9.

More specifically, the phase shift filters 12 and 13 are arranged to make the value $Q_{2D}$ relatively large in such a way as to have a maximum amount of delay in the neighborhood of the resonance frequency. The phase shift filter 11 is arranged to make the value $Q_{2D}$ relatively small in such a way as to increase the amount of delay of the low frequency band. Further, the phase shift filter 11 is arranged on a theoretical basis to have its resonance frequency $\omega_{2D}$ set at a frequency higher than that of the phase shift filter 13.

The reproduced signal is processed to equalize the amplitude and the phase thereof by the above-stated circuits 8 to 13. The signal thus processed is outputted through a terminal 14 to a circuit of a subsequent stage. The characteristics of the circuits 8 to 13 are arranged to be controlled by a control signal CTL1. Of these circuits, the phase shift filter 11 is arranged to have its characteristic controlled not only by the control Signal CTL1 but also by another control signal CTL2. Further, the integral equalizing circuit 8, the second-order LPFs 9 and 10 and the second-order phase shift filters 11, 12 and 13 jointly form a waveform equalizing circuit 17.

Figure 10:
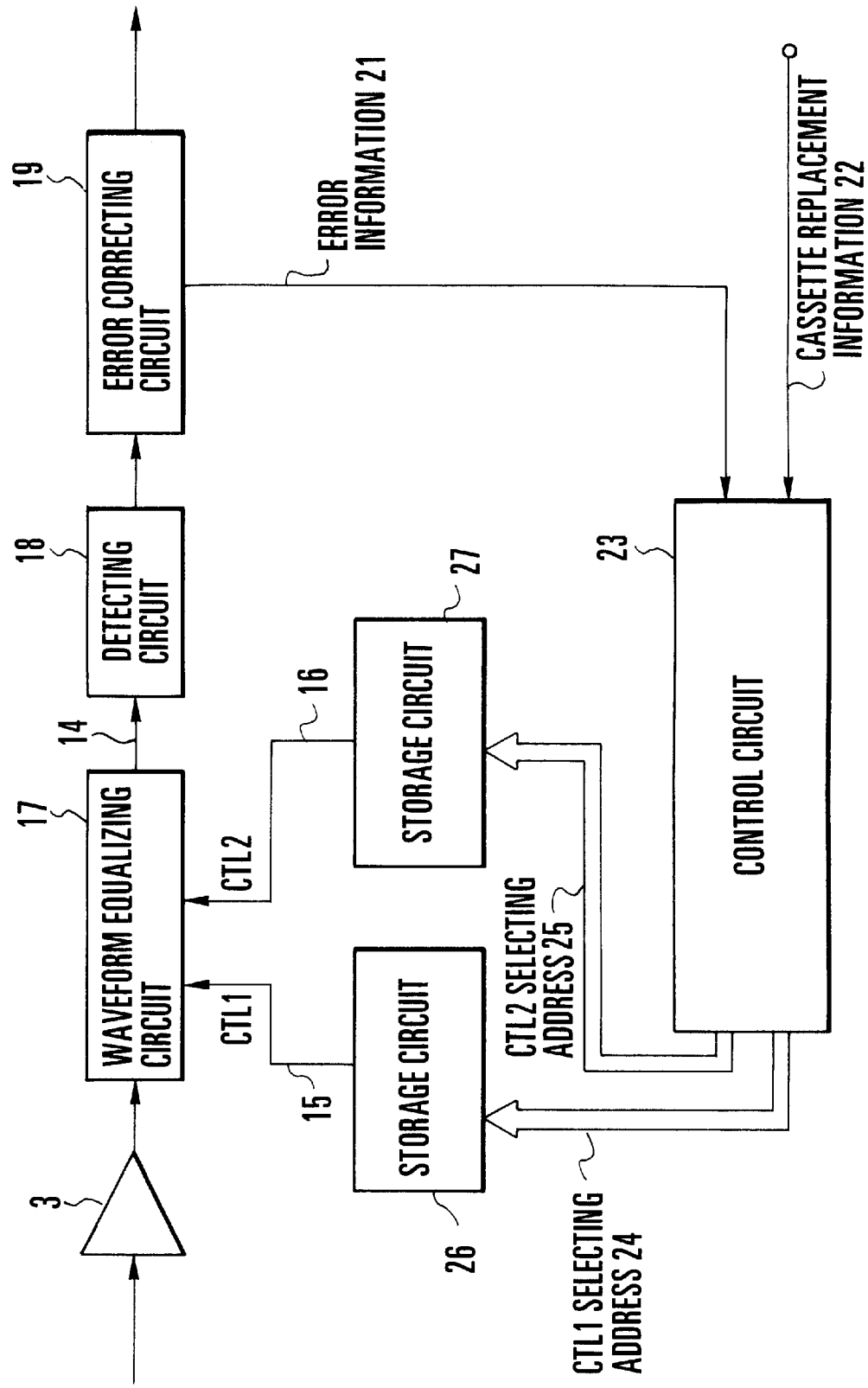
FIG. 10 is a block diagram of the arrangement of a reproduction system of the digital VTR which is the embodiment of this invention.

Control over the frequency characteristics of the equalizing circuits arranged as described above is next described as follows: FIG. 10 shows in a block diagram the arrangement of the whole reproduction system of the digital VTR which includes the equalizing circuits of FIG. 2. Referring to FIG. 10, the reproduced signal is amplified to a predetermined level by the preamplifier 3 as mentioned in the foregoing. The waveform of the amplified signal is converted by the waveform equalizing circuit 17 into a waveform suited for reproduction. The circuits shown in FIG. 2 are used for the waveform equalizing circuit 17 as mentioned in the foregoing. The signal which has been waveform-equalized by the waveform equalizing circuit 17 is supplied to a detecting circuit 18.

The detecting circuit 18 restores the waveform-equalized reproduced signal to its original digital data and supplies it to an error correcting circuit 19. In other words, although the signal reproduced by the head 1 is a digital signal, the reproduced signal has a waveform the amplitude of which continuously varies in an analogous manner. The signal outputted from the waveform equalizing circuit 17 has its amplitude vary also in an analogous manner. The detecting circuit 18 is, therefore, arranged to restore the reproduced signal to an original form of a digital signal consisting of "1"'s and "0"'s. The error correcting circuit 19 is arranged to correct any code error taking place during the process of transmission of the reproduced signal and to generate an error flag for any uncorrectable data if there is any data that is not correctable. The error flags thus generated are supplied to a control circuit 23.

The waveform equalizing circuit 17 varies its circuit characteristic under the control of the control signals CTL1 and CTL2 as mentioned above. The values of the control signals CTL1 and CTL2 are set beforehand and are stored respectively in storage circuits 26 and 27. The control signals CTL1 and CTL2 are supplied to the waveform equalizing circuit 17 according to instructions given from the control circuit 23. More specifically, the control circuit 23 sends information on selection addresses to the storage circuits 26 and 27 to cause them to output values according to the selection addresses.

According to this method of control, the control value is selected in the following manner: The error flags are counted for a predetermined period of time and the control value is set in such a way as to minimize the count value thus obtained. To the control circuit 23 is inputted also information on replacement of one cassette with another. The control value is set every time the cassette is replaced with another cassette.

The values of the control signals CTL1 and CTL2 which are parameters for control over the waveform equalizing circuit 17 are determined as follows:

The amplitude transmitting characteristic of the magnetic recording/reproducing system is first proximately expressed by a formula (1) as follows:

$$Vout = V_1 \frac{1}{\lambda} \exp(2\pi d/\lambda) = V_1' f \exp(2\pi f d/v) \quad (1)$$

wherein $\lambda$ represents recording wavelength [$\mu$m]; f frequency [Hz]; v relative velocity [$\mu$m/s]; V, V' reference levels [v]; and d decrease [$\mu$m].

The formula (1) above is based on the concept of proximately replacing, with exponential functions, all the adverse effects of losses of varied kinds relative to the recording wavelength. In the formula (1), "d" is a parameter indicative of a decrease in the frequency characteristic in the magnetic recording/reproducing system. In other words, the frequency characteristic increases accordingly as the parameter d becomes smaller.

In the case of this embodiment, the parameter d is considered to vary with the kind of the recording medium, the lapse of time, a difference in recording mode of the recording apparatus, etc. With this concept, a parameter $\Delta d$ is defined by a formula (2) as follows:

$$d = d_0 + \Delta d = d_0 + CTL1 \quad (2)$$

Figure 11:
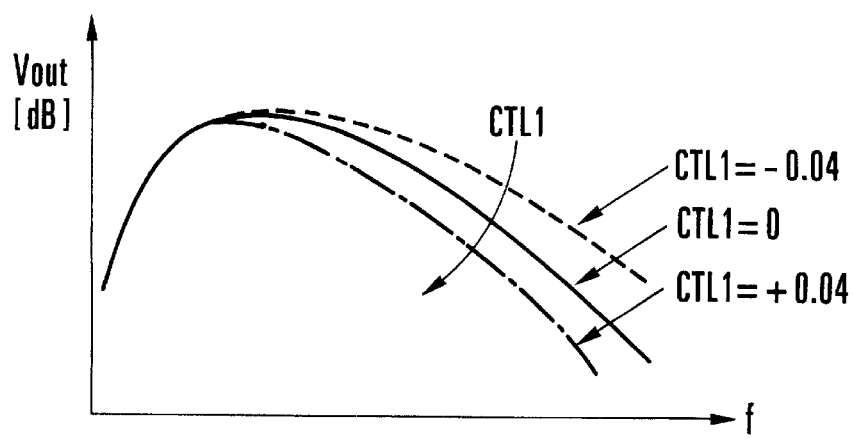
FIG. 11 shows a relationship in the embodiment of this invention between control signals (CTL) and electromagnetic Conversion characteristics.

In the case of this embodiment, the parameter d is used as a control parameter (signal) CTL1. FIG. 11 shows how the control waveform of the control parameter CTL1 varies in relation to changes of the electromagnetic conversion characteristic in the embodiment.

Another control signal CTL2 is next described. In the case of this embodiment, the control signal CTL2 is defined as a parameter representing a difference of phase characteristic resulting from the kind and the manufacturing method of the recording medium to be used. The control signal CTL2 is arranged to be a parameter of a binary value to be used in selecting the conditions of the phase shift filter 11.

The details of control to be performed over the characteristic of the waveform equalizing circuit 17 by using the control signals CTL1 and CTL2 are next described as follows: In the case of the embodiment, the amplitude equalizing process shown at the first half portion in FIG. 2 is first controlled with the control signal CTL1. Then, to compensate for the phase characteristic resulting from the control over the first half portion, the delay equalizing process shown at the latter half portion in FIG. 2 is controlled also with the control signal CTL1.

The control signal CTL2 is used for control over the first step of the delay equalizing process only, i.e., only for the phase shift filter 11. As mentioned above, the control by the control signal CTL2 is performed for selecting the condition which varies according to the kind and the method of manufacture of the medium in use.

Figure 12:
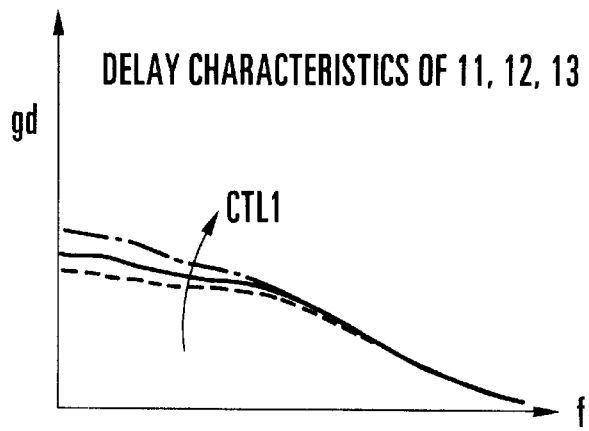
FIG. 12 shows the characteristic of a delay equalizing system shown in FIG. 2.
Figure 13:
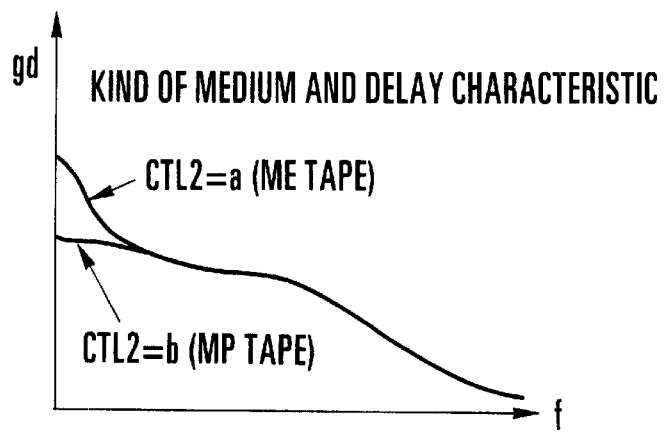
FIG. 13 shows the delay characteristic of a phase shift filter of a first stage shown in FIG. 2.

Each of the circuits is controlled as follows:

The integral equalizing circuit 8 is controlled by the control signal CTL1 as shown in FIG. 4. The second-order LPFs 9 and 10 are controlled by the control signal CTL1 as shown in FIGS. 5 and 6. Then, the amplitude equalizing system as a whole is controlled by the control signal CTL1 in a manner as shown in FIG. 7. Further, the delay equalizing system as a whole is controlled by the control signal CTL1 as shown in FIG. 12 and also controlled by the other control signal CTL2 as shown in FIG. 13.

In the case of this embodiment, the control functions are set beforehand for the resonance frequency $\omega$ and the quality factor Q. The characteristics of the applicable circuits are controlled by varying the values of $\omega$ and Q by the control signal CTL1 on the basis of the control functions set beforehand. The details of the control are as shown in FIGS. 14 to 19.

Figure 14:
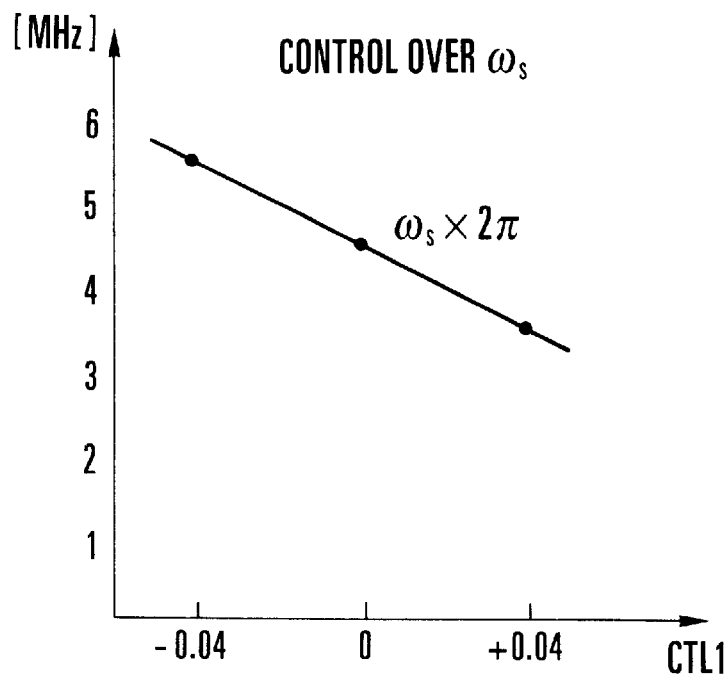
FIG. 14 shows how the resonance frequency of the integral equalizing circuit shown in FIG. 2 is controlled.
Figure 15:
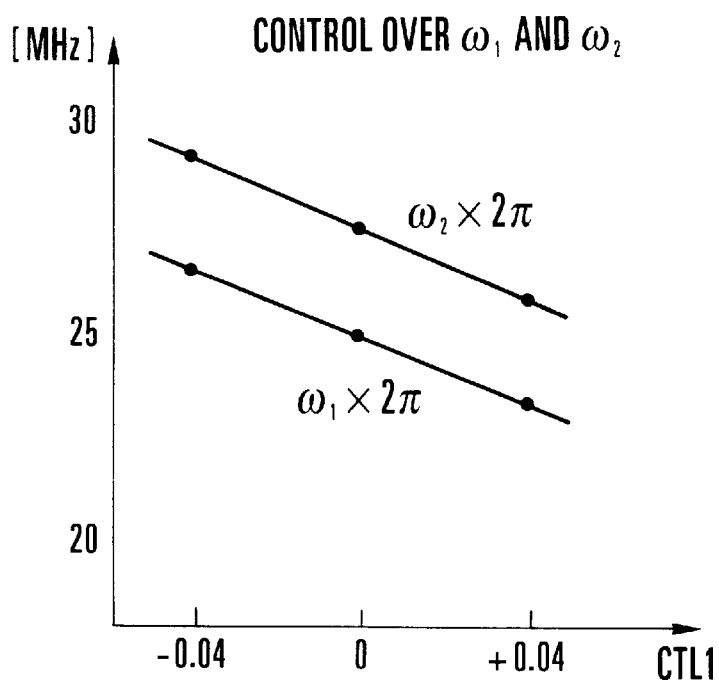
FIG. 15, shows how the resonance frequency of the LPF shown in FIG. 2 is controlled.
Figure 16:
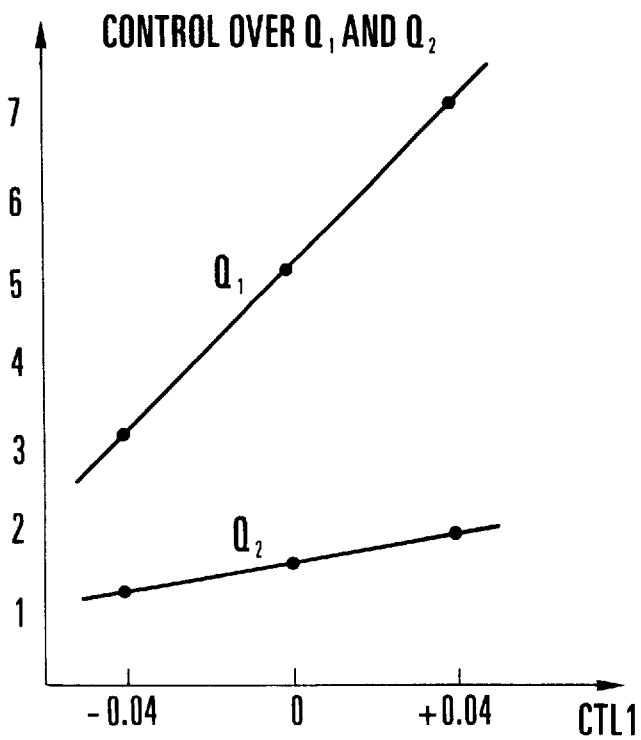
FIG. 16 shows how the quality factors (Q) of the LPF shown in FIG. 2 are controlled.

FIG. 14 shows how the resonance frequency of the integral equalizing circuit 8 changes. As shown, the resonance frequency is controlled linearly in relation to the control signal CTL1. FIG. 15 shows how the resonance frequencies of the LPFs 9 and 10 change. FIG. 16 shows the changes of the quality factor Q of the LPFs 9 and 10. The resonance frequency and the quality factor Q of each of the LPFs 9 and 10 are linearly controlled in relation to the control signal CTL1.

Figure 17:
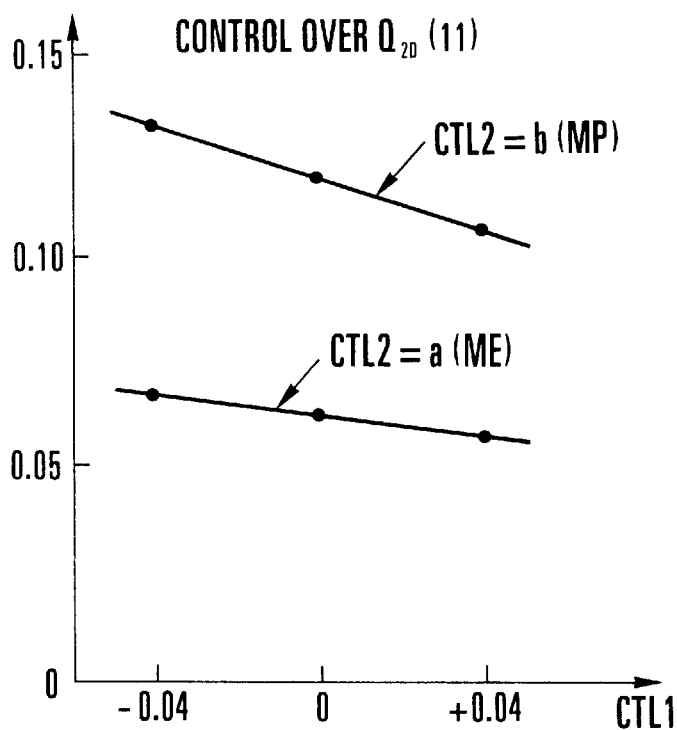
FIG. 17 shows how the quality factor of a phase shift filter of a first stage shown in FIG. 2 is controlled.
Figure 18:
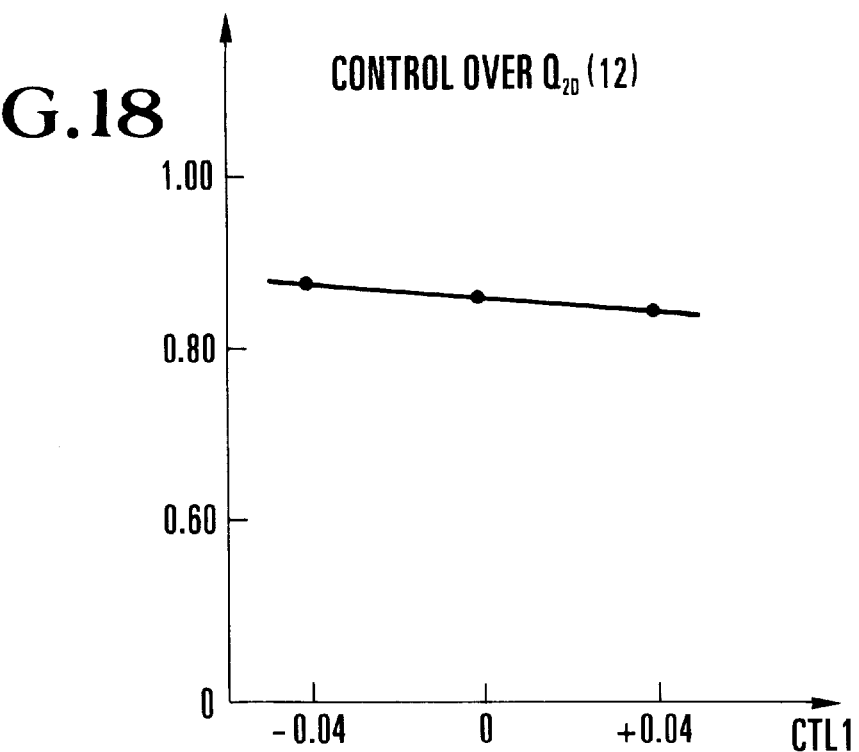
FIG. 18 shows how the quality factor of a phase shift filter of a second stage of FIG. 2 is controlled.
Figure 19:
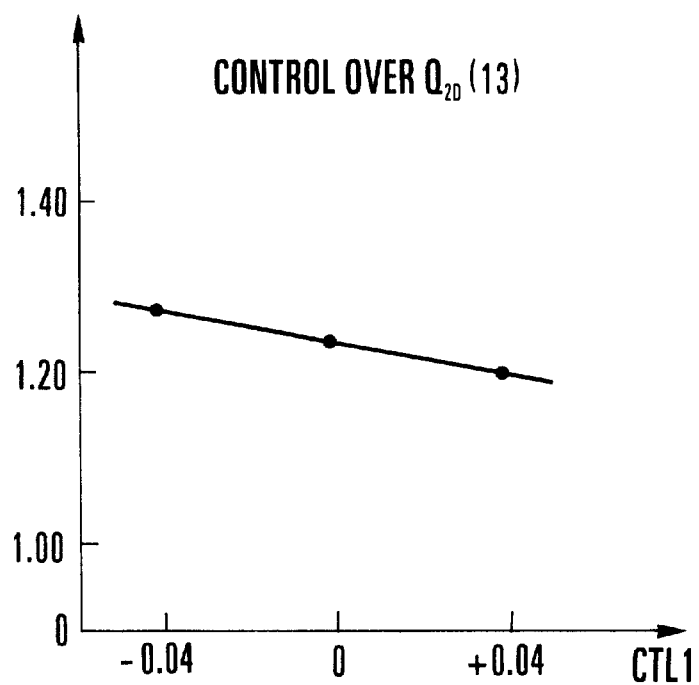
FIG. 19 shows how the quality factor of a phase shift filter of a third stage of FIG. 2 is controlled.

FIG. 17 shows how the resonance frequency of the phase shift filter 11 changes. The phase shift filter 11 is controlled linearly in relation to the control signal CTL1 and selectively by the control signal CTL2. FIGS. 18 and 19 respectively show how the phase shift filters 12 and 13 change. As shown, they are controlled linearly in relation to the control signal CTL1 Further, the resonance frequency of each circuit of the delay equalizing system is arranged to be unvarying.

According to the arrangement of this embodiment, as described above, the characteristic of each circuit can be univocally determined from a single parameter as shown in FIGS. 7 and 12. A desired equalizing characteristic, therefore, can be very simply obtained by just varying a single parameter. The quality of the reproduced signal thus can be prevented from deteriorating.

Figure 20:
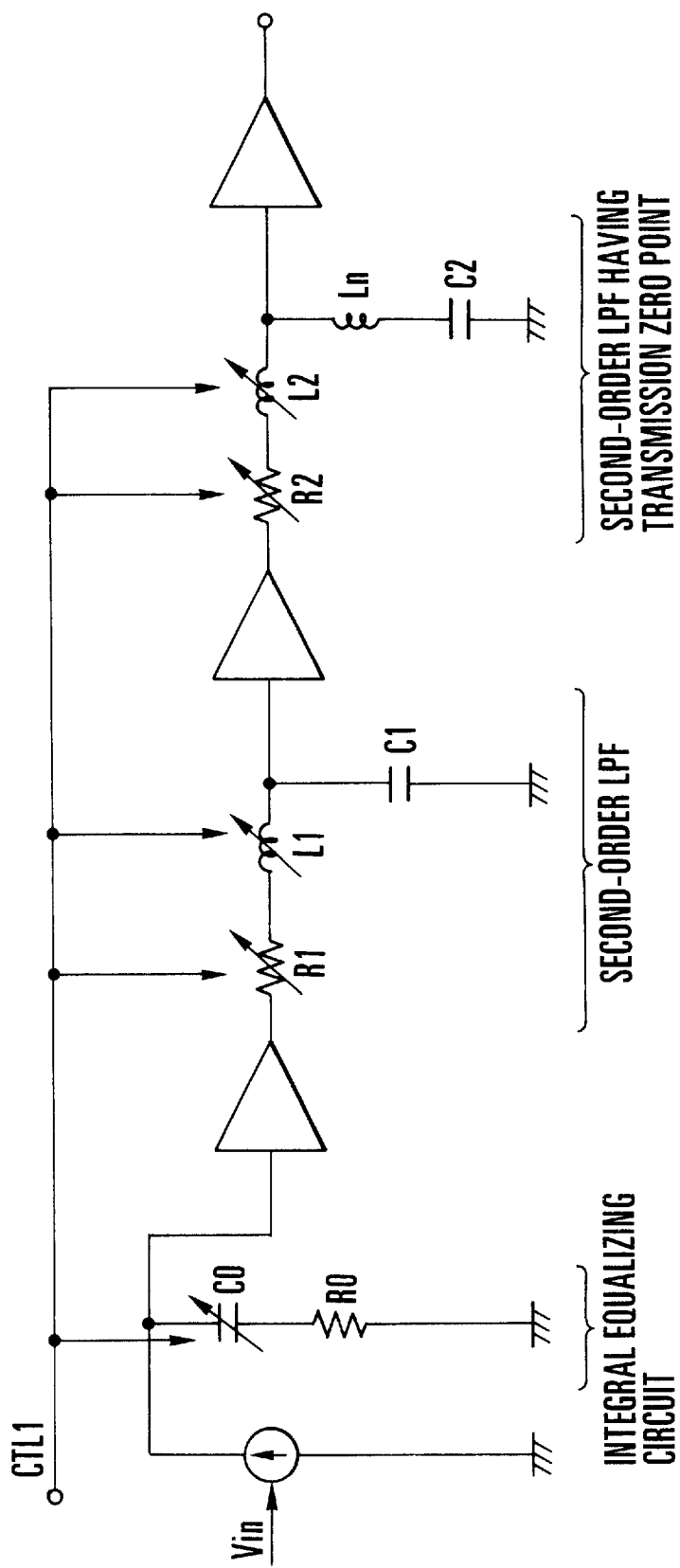
FIG. 20 is a circuit diagram showing the details of the amplitude equalizing system shown in FIG. 2.
Figure 21:
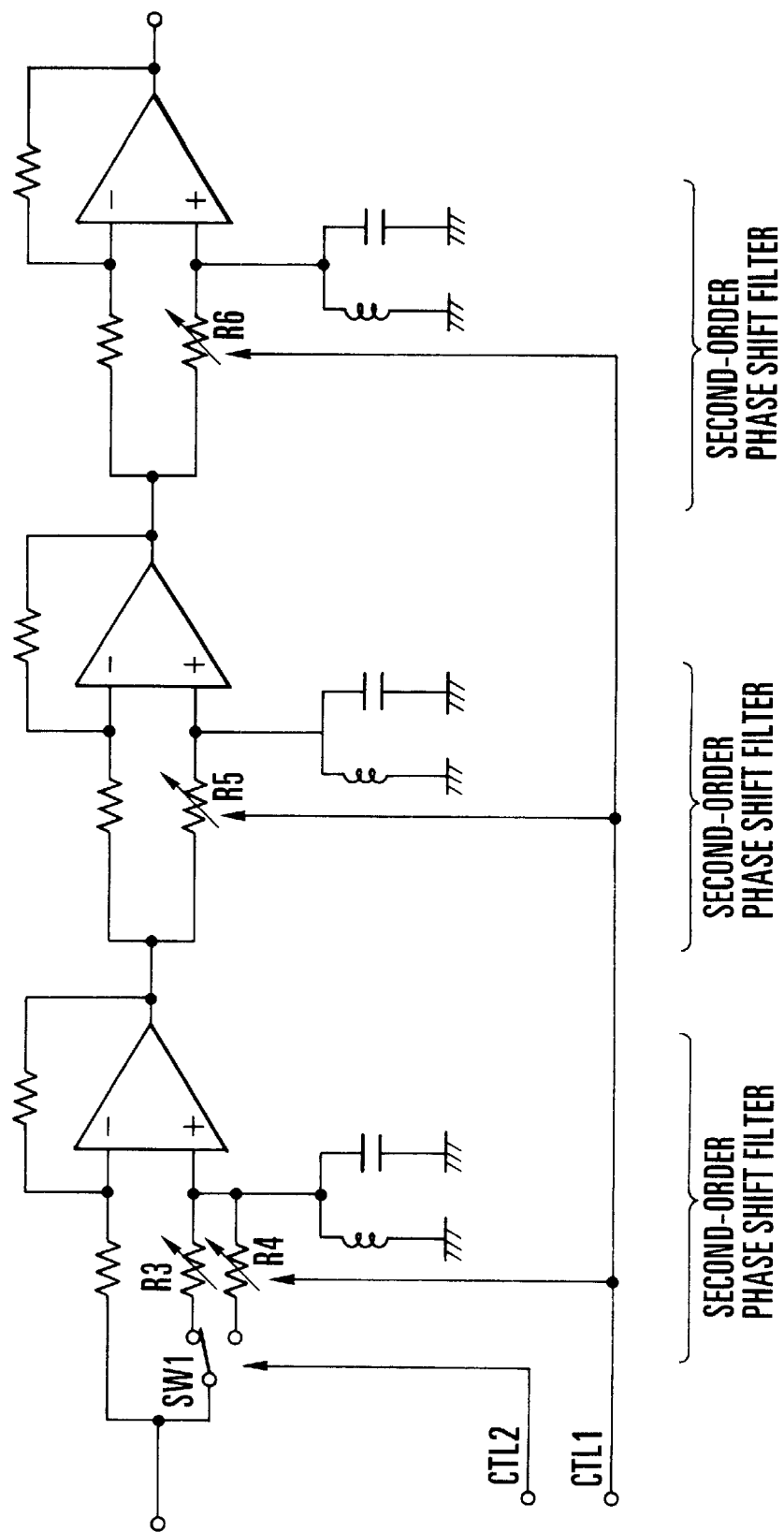
FIG. 21 is a circuit diagram showing the details of a delay equalizing system shown in FIG. 2.

The details of the amplitude equalizing system and the delay equalizing system mentioned above are as shown in FIGS. 20 and 21. In the case of the embodiment, each of the equalizing circuits is composed of an LC filter. FIG. 20 shows the arrangement of the amplitude equalizing system. FIG. 21 shows the arrangement of the delay equalizing system.

Control over the resonance frequency of the integral equalizing circuit shown at the part (a) of FIG. 3 is performed by controlling an element C0 shown in FIG. 20 with the control signal CTL1. Control over the resonance frequency and the quality factor Q of the LPF shown at the part (b) of FIG. 3 is performed by controlling elements R1 and L1 shown in FIG. 20 with the control signal CTL1. Control over the resonance frequency and the quality factor Q of the LPF shown at the part (c) of FIG. 3 is performed by controlling elements R2 and L2 shown in FIG. 20 with the control signal CTL1.

The quality factor Q of the phase shift filter shown at the part (d) of FIG. 3 is controlled by controlling elements R3 to R6 shown in FIG. 21 with the control signal CTL1. Further, the characteristic of the phase shift filter 11 is selected by switching the position of a switch SW1 shown in FIG. 21 with the control signal CTL2.

Figure 22:
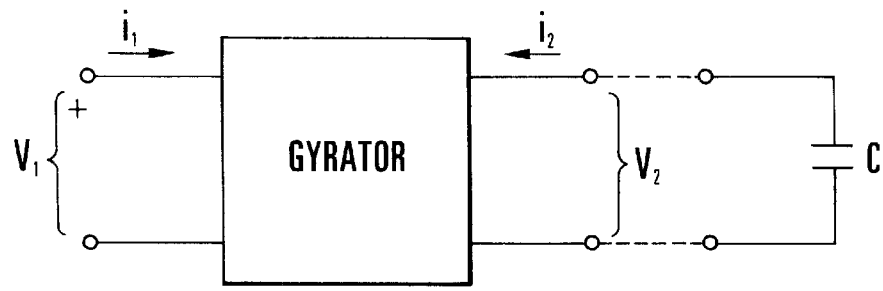
FIG. 22 shows by way of example the arrangement of inductors included in the circuits of FIGS. 20 and 21.
Figure 23:
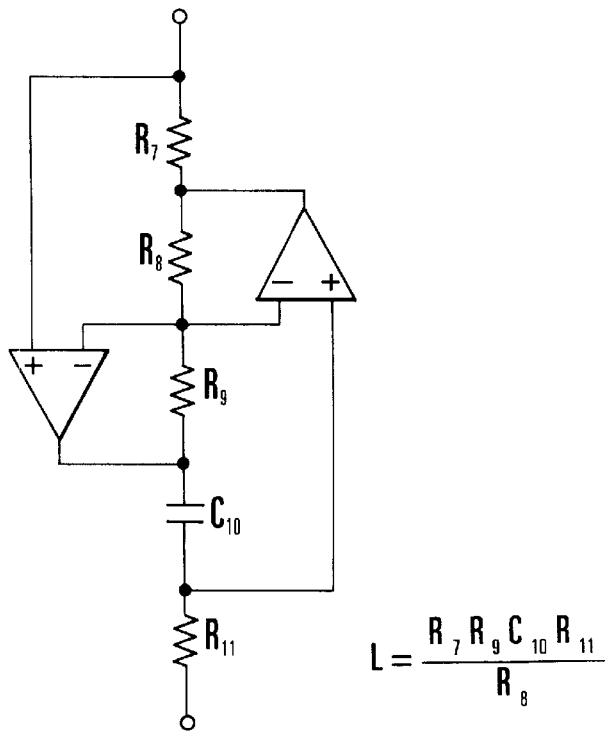
FIG. 23 shows another example of arrangement of inductors included in the circuits of FIGS. 20 and 21.
Figure 24:
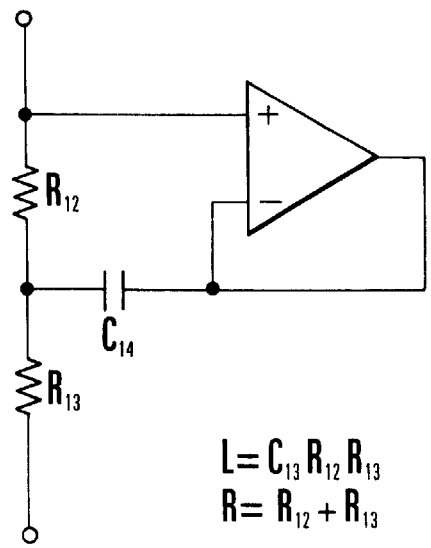
FIG. 24 shows a further example of arrangement of inductors included in the circuits of FIGS. 20 and 21.

For control over the inductance of each circuit, it is preferable to use a simulated inductor on account of the easiness of the control and reduction in size of the circuit. Further, with respect to an adjustable resistor, it is preferable to use an electronic volume. FIGS. 22, 23 and 24 show the arrangement of some of simulated inductors used in general.

FIG. 22 shows a simulated inductor using a gyrator. FIG. 23 shows a simulated inductor using a GIC (generalized immittance converter) active filter. FIG. 24 shows a simplified type simulated inductor using an operational amplifier.

Figure 25:
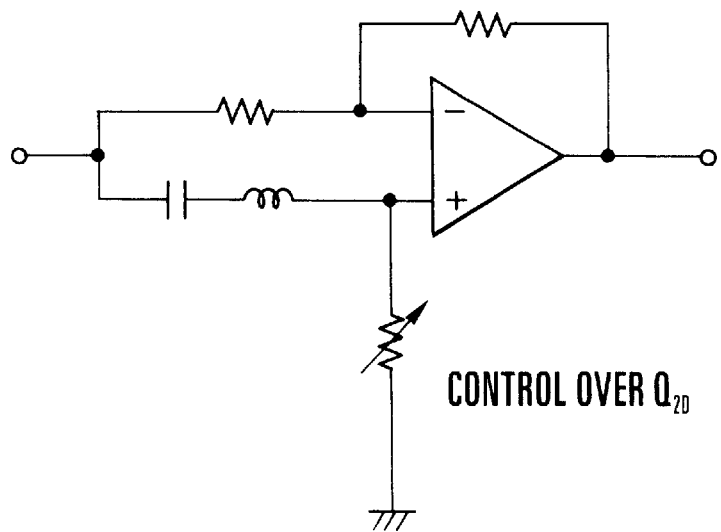
FIG. 25 shows by way of example the arrangement of a second-order phase shift filter.
Figure 26:
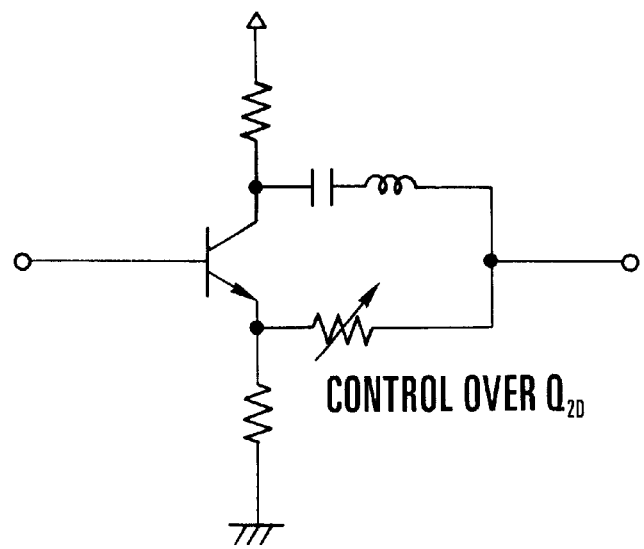
FIG. 26 shows another example of arrangement of the second-order phase shift filter.

FIGS. 25 and 26 show some other examples of arrangement of the second-order phase shift filter.

Figure 27:
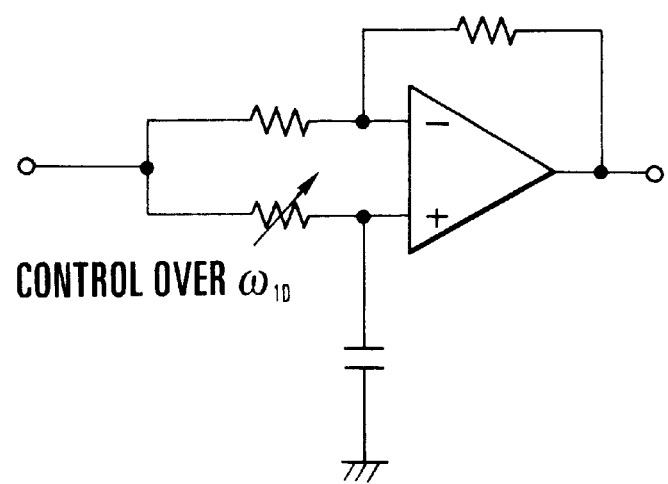
FIG. 27 shows by way of example arrangement of a first-order phase shift filter.
Figure 28:
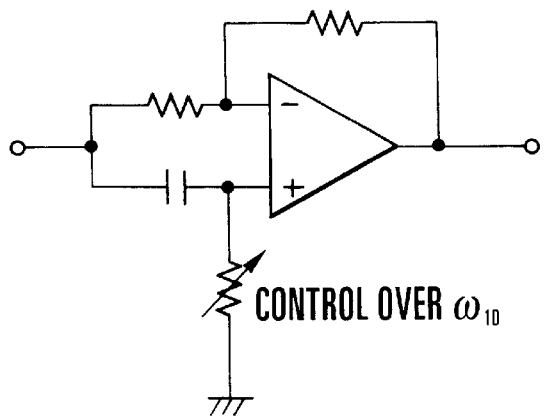
FIG. 28 shows another example of arrangement of the first-order phase shift filter.

While second-order phase shift filters are used in the embodiment described above, it is possible to use first-order phase shift filters according to this invention. FIGS. 27 and 28 show some examples of the arrangement of the first-order phase shift filters. In a case where the first-order phase shift filters are used, the cutoff frequency of the phase shift filter of one step is arranged to differ from that of the phase shift filter of another step.

Figure 29:
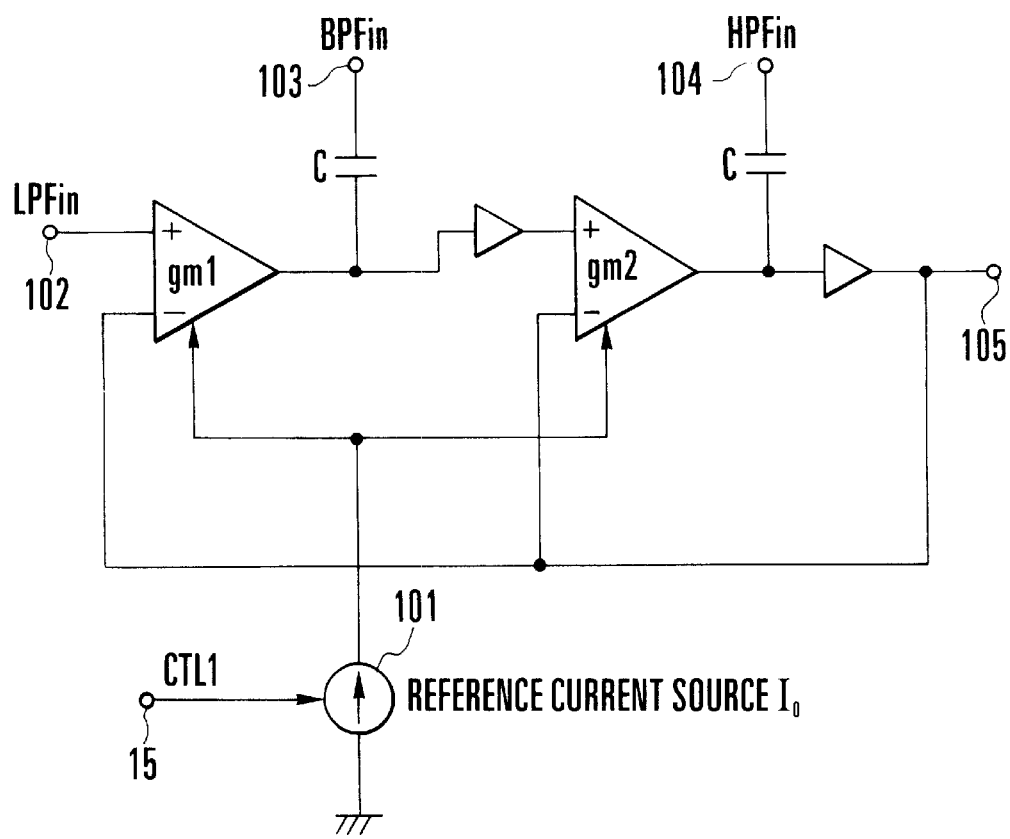
FIG. 29 shows the arrangement of a gm filter usable for the embodiment of this invention.

FIG. 29 shows by way of example the arrangement of a gm filter which is usable as a part of each circuit of the amplitude equalizing system shown in FIG. 2.

In using the circuit of FIG. 29, the embodiment is arranged to be capable of controlling the resonance frequency and the quality factor Q of the second-order LPF obtained, for example, with a terminal 102 used as an input terminal and a terminal 105 as an output terminal, by controlling a reference current source 101 with the control signal CTL1.

While this invention is applied to a digital VTR in the case of the embodiment described, this invention is not limited to digital VTRs. The same advantageous effect is attainable by applying this invention to any other apparatus as long as it is arranged to control the frequency characteristic of a signal reproduced from a recording medium other than a tape.

In accordance with the arrangement of this invention, as apparent from the foregoing description, an equalizing characteristic can be very simply changed by controlling a plurality of controlled elements of an equalizing means with a single parameter.

Therefore, an optimum equalizing characteristic an be obtained through a simple process, and the reproduced signal can be prevented from deteriorating.

With the resonance frequency and the quality factor Q controlled by controlling a plurality of controlled elements of circuits with a single parameter, the circuit characteristic based on the resonance frequency and the quality factor Q can be controlled in a very simple manner.

What is claimed is:

1. A reproducing apparatus comprising:

reproducing means for reproducing a signal;

equalizing means for equalizing the signal reproduced by the reproducing means, said equalizing means including a plurality of equalizing circuits having different equalizing characteristics from each other, each of the plurality of equalizing circuits having controllable circuit elements, each of the plurality of equalizing circuits having a resonant frequency and a quality factor which are controllable; and control means for controlling the resonant frequency and the quality factor of the plurality of equalizing circuits by adjusting the controllable circuit elements of the plurality of equalizing circuits with a common control signal having the same value over the plurality of equalizing circuits to control an equalizing characteristic of said equalizing means defined by the plurality of equalizing circuits according to a predetermined equalizing characteristic.

2. An apparatus according to claim 1, wherein said equalizing means further includes a plurality of circuits having respective different resonant frequencies and respective different quality factors (Q), and wherein said control means controls the resonant frequencies and the quality factors (Q) by using a parameter.

3. An apparatus according to claim 1, further comprising error detecting means for detecting errors included in the reproduced signal, wherein said control means determines the value of said common control signal according to an output of said error detecting means.

4. An apparatus according to claim 3, wherein said control means determines the value of said common control signal in such a way as to cause a count value, which corresponds to a count of the output of said error detecting means for a predetermined period of time, to become smaller.

5. A reproducing apparatus comprising:

reproducing means for reproducing a signal;

equalizing means for equalizing the signal reproduced by the reproducing means, said equalizing means including an amplitude equalizing circuit for controlling an amplitude of the reproduced signal and a group-delay equalizing circuit for controlling a group-delay of the reproduced signal, each of the amplitude equalizing circuit and the group-delay equalizing circuit having controllable circuit elements; and control means for controlling an equalizing characteristic of said equalizing means according to a predetermined amplitude equalizing characteristic and a predetermined group-delay equalizing characteristic by adjusting the controllable circuit elements of the amplitude equalizing circuit and the group-delay equalizing circuit with a common control signal having the same value over the amplitude equalizing circuit and the group-delay equalizing circuit.

6. An apparatus according to claim 5, wherein said amplitude equalizing circuit includes a circuit for emphasizing a low-frequency component of the reproduced signal.

7. An apparatus according to claim 5, wherein said reproducing means reproduces a signal from a recording medium, and wherein said control means further controls an equalizing characteristic of said group-delay equalizing circuit according to a kind of the recording medium.

8. A signal processing apparatus comprising:

reproducing means for reproducing a signal;

equalizing means for equalizing the signal reproduced by the reproducing means, said equalizing means comprising an amplitude equalizing circuit for controlling an amplitude of the input signal and a group-delay equalizing circuit for controlling a group-delay of the input signal; and control means for outputting a common control signal to the amplitude equalizing circuit and the group-delay equaling circuit and adjusting an equalizing characteristic of said equalizing means according to a predetermined amplitude equalizing characteristic and a predetermined group-delay equalizing characteristic by controlling the amplitude equalizing circuit and the group-delay equalizing circuit with the common control signal having the same value over the amplitude equalizing circuit and the group-delay equalizing circuit.

9. Apparatus according to claim 8, wherein the amplitude equalizing circuit emphasizes a low frequency component of the input signal.

10. Apparatus according to claim 8, wherein said reproducing means inputs the signal reproduced from a recording medium, and wherein said control means adjusts the equalizing characteristic of the group delay equalizing circuit on the basis of the kind of recording medium.

11. Apparatus according to claim 10, wherein said control means adjusts the equalizing characteristic corresponding to a low frequency component on the basis of the kind of recording medium.

12. Apparatus according to claim 8, wherein said control means comprises storage means for storing predetermined values of the common control signal beforehand, and wherein said control means outputs the common control signal of the valued stored in the storage means to the plurality of the equalizing circuits.

13. Apparatus according to claim 8, wherein said reproducing means inputs the signal reproduced from a magnetic recording medium, and wherein said equalizing means has an equalizing characteristic for compensating a decrease of the input signal in a magnetic recording/reproducing system.

\* \* \* \* \*

UNITED STATES PATENT AND TRADEMARK OFFICE
CERTIFICATE OF CORRECTION

PATENT NO.   : 6,445,526 B1                                                      Page 1 of 1
DATED        : September 3, 2002
INVENTOR(S)  : Kiwamu Kobayashi et al.

It is certified that error appears in the above-identified patent and that said Letters Patent is hereby corrected as shown below:

Column 1,
Line 17, "in" should read -- for -- and "for" should read -- in --.

Column 3,
Line 6, "Conversion" should read -- conversion --.

Column 4,
Line 56, "Signal CTL1" should read -- signal CTL1 --.

Column 8,
Line 1, "an be" should read -- can be --.

Column 9,
Line 16, "equaling" should read -- equalizing --.

Column 10,
Line 2, "low frequency" should read -- low-frequency --.
Line 6, "group delay" should read -- low-frequency --.

Signed and Sealed this

Eighteenth Day of February, 2003

JAMES E. ROGAN
*Director of the United States Patent and Trademark Office*